(No Model.)
J. L. STEWART & J. L. HASTINGS.
PROCESS OF AND APPARATUS FOR BAKING OR FIRING COMPOUNDS OF PLASTIC MATERIAL, &c.
No. 350,567. Patented Oct. 12, 1886.
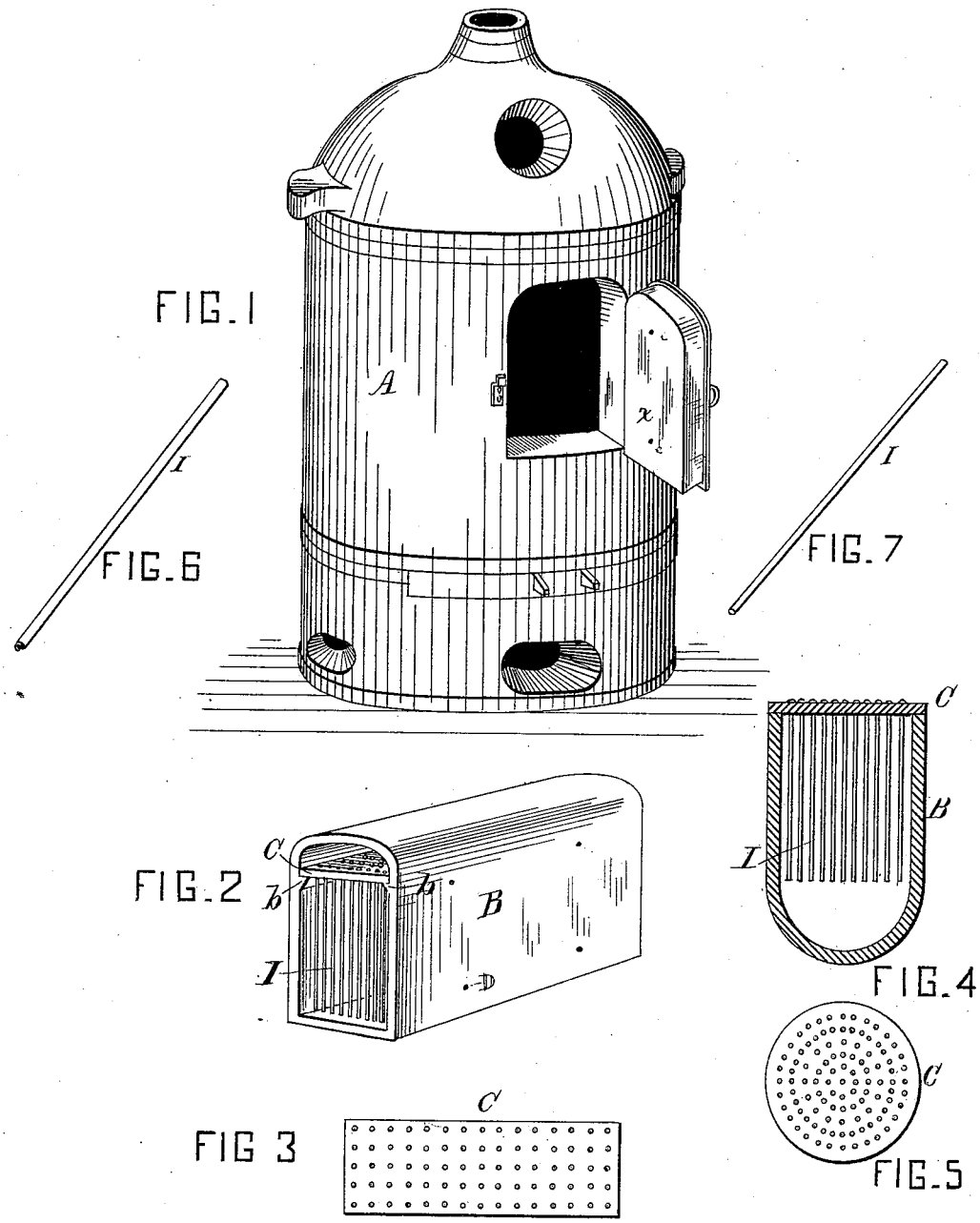

UNITED STATES PATENT OFFICE.

JOHN L. STEWART AND JAMES L. HASTINGS, OF PHILADELPHIA, PA.

PROCESS OF AND APPARATUS FOR BAKING OR FIRING COMPOUNDS OF PLASTIC MATERIAL, &c.

SPECIFICATION forming part of Letters Patent No. 350,567, dated October 12, 1886.

Application filed January 9, 1886. Serial No. 188,077. (No model.)

*To all whom it may concern:*

Be it known that we, JOHN L. STEWART and JAMES L. HASTINGS, citizens of the United States, residing at Philadelphia, in the county of Philadelphia and State of Pennsylvania, have invented certain new and useful Improvements in Processes of and Apparatus for Baking or Firing Compounds of Plastic Material for Producing Vitreous or Crystalline Articles; and we do hereby declare the following to be a full, clear, and exact description of the invention, such as will enable others skilled in the art to which it appertains to make and use the same.

This invention relates to a new process and apparatus for baking or firing compounds of plastic material molded into forms for producing vitreous or crystalline articles for various uses in the arts, and more particularly for use in connection with gas and other burners for producing illumination by incandescence.

The object of the invention is to bake at a high temperature articles of plastic mineral compounds in the form of slender cylindrical rods, needles, or pencils, or slender strips of any cross-section, and slender tubes or hollow strips of any cross-section, without adhesion thereto of foreign matter, and without twisting or bending thereof, such rods or tubes being adapted for yielding light by incandescence under the action of a gas-flame or other means of heat. Much difficulty has been experienced in firing the slender rods and tubes above mentioned, and in preventing them from sticking together and to prevent foreign matter from combining with and adhering to them; also in keeping them straight and from breakage by contraction, and also in removing the vaporizable matter of the flux or other volatile ingredients of the compound. By our improved method and apparatus we overcome these difficulties and secure a number of improved results.

In carrying out our invention we suspend the rods or tubes vertically from a perforated supporting-plate or other means of support in a muffle or crucible made of fire-clay or other suitable materials, or it may be from a suitable support directly in contact with a suitable flame, or exposed to highly-heated products or other gaseous media, the essential condition being that the rods or tubes are suspended vertically from a support out of contact with each other and exposed to a high heat. We also place in the crucible or muffle containing the rods or tubes a substance which has a chemical affinity for and will combine with volatile matter of the flux or other ingredient in the plastic compound composing the rods or tubes. For instance, if a fluoride flux is used in the compound of which the rods or tubes are formed, then a substance—such as silica, dolomite, marble, or lime—having an affinity for fluorine, is placed, in suitable proportions, in the crucible or muffle previous to the operation of firing, so that while firing the fluorine will be set free from the compound and combined with the silica, dolomite, marble, or lime. Numerous other substances besides silica, dolomite, marble, and lime may be used for taking up the fluorine. In case other fluxes than fluorides be used in the compounds, then other substances having an affinity for the volatile matter of the flux used are placed in the crucible or muffle.

Slender pencils or rods of refractory earthy material have been used for incandescent lighting; but they were objectionable in being very fragile and dangerous in use if made slender or thin enough to become incandescent in the gas-flame by reason of their tendency to break while hot and fall upon inflammable articles, and if made sufficiently heavy to render them strong they could not economically be made to give the desired light in the gas-flame. Now, to overcome these difficulties, we have made the pencils hollow, in the form of tubes, with thin walls, and thereby secure much improved results, for such tubes may be made comparatively large—that is, larger in cross-section than the solid rods—and thereby an increased illuminating or incandescing surface secured, while by reason of the thin walls of such tubes they readily become incandescent in a moderate gas-flame, and at the same time are much stronger than the solid rods. Such slender tubes of refractory material for incandescent illumination form an important feature of our invention.

The matter constituting our invention will be defined in the claims.

In the accompanying drawings, Figure 1 represents a perspective view of a muffle-furnace suitable for our purpose. Fig. 2 represents a perspective view of the muffle with the suspending-plate and rods or tubes placed in position. Fig. 3 represents a top view of the perforated holding-plate. Fig. 4 represents a vertical section of a crucible containing rods or plates; and Fig. 5 represents a top view of its perforated cover or holding-plate, all of which are made of fire-clay or other suitable materials. Figs. 6 and 7 represent, respectively, perspective views of a tube and a rod approximately of the size actually used.

The furnace A, for receiving the muffle or retort B, may be in most respects in the usual form, except that the middle section should be longer or deeper in order to receive the deep muffle used, and a deep muffle is desirable, in order that rods or tubes twelve inches or more in length may be burned. Such rods or tubes, after burning, are readily broken into the required lengths. The opening and door $x$ in the middle section of the furnace are made of a height and shape corresponding to the shape and size of the muffle. Small holes $e$, near the bottom and top of door, serve for the circulation of air. The muffle B is made with vertical sides, with small holes D, for ventilation, and has near its top a ledge or a number of lugs, $b$, on each side, for supporting the suspending-plate C. This plate C is perforated for insertion of the rods or tubes I, which are held at their upper ends by small knobs or heads of clay or plastic compound, or by having their ends bent over while they are still soft or pliable. The rods or tubes may be suspended from horizontal rods or bars of refractory material, their ends being bent over and hooked onto such rods or bars.

Instead of the muffle shown in Fig. 2, a deep fire-clay crucible, B, (shown in Fig. 4,) may be used, and with such crucible a perforated suspending-cover, C, (shown in Fig. 5,) is used. Such crucibles, preferably with flat bottoms, are more convenient and desirable under some conditions. For instance, a large number of them may be conveniently stacked up in a large kiln and all fired together.

The compounds of which the tubes and rods are formed are composed generally of oxides, carbonates, or sulphates of calcium, magnesium, strontium, various compounds containing silica and alumina, oxide sulphates or carbonate of glucinium, oxide sulphates or carbonates of zirconium, &c., combined with a suitable flux, preferably a fluoride, as fluor-spar or cryolite, &c., and a suitable moistening-fluid, as glycerine or a hydrocarbon.

Special compounds constituting our invention are made subjects of separate applications for patents now on file.

The tubes or rods having been molded and partially dried, they are then inserted in the suspending-plates and first dried at a moderate temperature to remove the moisture. The plates holding the tubes or rods are then properly placed in the muffle or crucible; a suitable proportion of silica, dolomite, marble, or lime to absorb the fluorine of the flux is placed in such muffle or crucible, and then the latter are inserted in the furnace, where they are subjected to a high degree—from two to five thousand degrees (2,000° to 5,000°) Fahrenheit—till the flux is burned out and the compound composing the tubes or rods is changed to the vitreous or crystalline condition, whereby the rods or tubes are brought to a condition in which they are readily heated to incandescence and made strong and durable. After the rods or tubes are fired in the furnace they may be subjected to the heat of a water or other gas flame, for tempering them and improving their quality.

Having described our invention, what we claim, and desire to secure by Letters Patent, is—

1. The process of baking or firing articles of earthy or mineral compounds, which consists in suspending them from suitable supports and subjecting them to a high heat in a furnace or gas-flame.

2. The process of baking or firing slender tubes or rods of plastic earthy or mineral compounds, which consists in suspending them at one end, out of contact with each other, from a suitable support and subjecting them to a high heat.

3. The process of baking or firing slender tubes or rods of an earthy or mineral compound containing a flux, which consists in suspending them at one end from a suitable support in a chamber, in the presence of a substance or compound that will take up the volatile matter of the flux, and subjecting them to a high heat in a furnace, gas-flame, heated products, or other gaseous media.

4. The process of baking or firing tubes or rods composed of an earthy or mineral compound containing a fluoride flux, which consists in suspending them at one end from a suitable support in the presence of a substance having an affinity for fluorine, as silica or lime, and subjecting them to a high heat, as and for the purpose described.

5. The process of baking or firing tubes or rods of an earthy or mineral compound, which consists in suspending them from a suitable support out of contact with each other, and subjecting them to a high heat and afterward tempering them in a hydrogen, water, or other gas flame.

6. As an article of manufacture, slender tubes or hollow strips of an incandescing earthy or mineral compound suitable for incandescent illumination under the action of a gas-flame or other source of heat.

7. A muffle or crucible provided with ledges or lugs at or near its top, in combination with means for suspending rods or tubes of plastic material in such muffle or crucible.

8. A muffle or crucible provided with ledges or lugs near its top and holes for ventilation, in combination with a perforated suspending-plate for holding rods or tubes to be baked or fired.

9. In combination with a furnace, a muffle or crucible having supports at or near its top, and a perforated suspending-plate for holding rods or tubes to be baked or fired, as and for the purpose described.

In testimony whereof we affix our signatures in presence of two witnesses.

JOHN L. STEWART.
JAMES L. HASTINGS.

Witnesses:
CHAS. MATHEWS, Jr.,
FRED. SCHUR.